United States Patent
Shigeeda et al.

(10) Patent No.: US 9,818,028 B2
(45) Date of Patent: Nov. 14, 2017

(54) INFORMATION PROCESSING APPARATUS FOR OBTAINING A DEGREE OF SIMILARITY BETWEEN ELEMENTS

(71) Applicant: FUJI XEROX Co., Ltd., Tokyo (JP)

(72) Inventors: Nobuyuki Shigeeda, Kanagawa (JP); Yozo Kashima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/016,388

(22) Filed: Feb. 5, 2016

(65) Prior Publication Data
US 2017/0091547 A1 Mar. 30, 2017

(30) Foreign Application Priority Data
Sep. 30, 2015 (JP) .................. 2015-192960

(51) Int. Cl.
G06K 9/34 (2006.01)
G06K 9/36 (2006.01)
G06K 9/62 (2006.01)
G06K 9/00 (2006.01)
G06T 7/00 (2017.01)
G06K 9/20 (2006.01)

(52) U.S. Cl.
CPC ..... *G06K 9/00469* (2013.01); *G06K 9/00442* (2013.01); *G06K 9/2054* (2013.01); *G06K 9/6255* (2013.01); *G06T 7/0081* (2013.01); *G06T 2207/10004* (2013.01)

(58) Field of Classification Search
CPC ............. G06F 17/243; G06F 17/30256; G06F 9/00442–2009/00489
See application file for complete search history.

(56) References Cited

U.S. PATENT DOCUMENTS 4,748,678 A * 5/1988 Takeda ............. G06F 17/30017
382/236

FOREIGN PATENT DOCUMENTS

JP 2003-109007 A 4/2003
JP 2003-115028 A 4/2003

\* cited by examiner

*Primary Examiner* — Brian P Werner
(74) *Attorney, Agent, or Firm* — Sughrue Mion, PLLC (57) ABSTRACT

An information processing apparatus includes a first acquiring unit, an addition unit, a second acquiring unit, and an extraction unit. The first acquiring unit acquires a first group of elements included in a first image generated by reading a document. The addition unit generates multiple second images by adding noises that differ from each other to the first image. The second acquiring unit acquires second groups of elements included in the respective multiple second images. The extraction unit extracts an element representing characteristics of the document from the first group of elements in accordance with the degrees of similarity between elements included in the first group of elements and elements included in the multiple second groups of elements.

14 Claims, 5 Drawing Sheets

```
FORM A-1
                    FILING DATE  MONTH/DAY/YEAR

TO CREDIT DEPARTMENT

HOME LOAN APPLICATION FORM

|                | CONTENT OF APPLICATION |
       |                |                        |
       |                |                        |
       |                |                        |

NAME                    SEAL
```

| ELEMENT ID | CONTENT OF ELEMENT | POSITION INFORMATION |
|---|---|---|
| 001 | FORM A-1 | x =   , y = |
| 002 | FILING DATE (MONTH/DAY/YEAR) | x =   , y = |
| 003 | TO CREDIT DEPARTMENT | x =   , y = |
| 004 | HOME LOAN APPLICATION FORM | x =   , y = |
| 005 | CONTENT OF APPLICATION | x =   , y = |
| 006 | NAME          SEAL | x =   , y = |

FIG. 8

| ELEMENT ID | CONTENT OF ELEMENT | POSITION INFORMATION |
|---|---|---|
| 001 | FO      A-1 | x =   , y = |
| 002 | FILING         (MONTH/DAY/YEAR) | x =   , y = |
| 003 | TO CREDIT DEPARTMENT | x =   , y = |
| 004 | HOME LOAN APPLICAT      FORM | x =   , y = |
| 005 | CONTENT OF APPLICATION | x =   , y = |
| 006 | NA        TARO FUJI | x =   , y = |

FIG. 9

| DOCUMENT ID | ELEMENT ID | CONTENT OF ELEMENT | POSITION INFORMATION |
|---|---|---|---|
| 001 | 001 | FORM A-1 | x =   , y = |
|  | 002 | FILING DATE (MONTH/DAY/YEAR) | x =   , y = |
|  | 003 | TO CREDIT DEPARTMENT | x =   , y = |
|  | 004 | HOME LOAN APPLICATION FORM | x =   , y = |
|  | 005 | CONTENT OF APPLICATION | x =   , y = |

“Form A-1”, “Filing Date
INFORMATION PROCESSING APPARATUS FOR OBTAINING A DEGREE OF SIMILARITY BETWEEN ELEMENTS

CROSS-REFERENCE TO RELATED APPLICATIONS

This application is based on and claims priority under 35 USC 119 from Japanese Patent Application No. 2015-192960 filed Sep. 30, 2015.

BACKGROUND

Technical Field

The present invention relates to an information processing apparatus, an information processing method, and a non-transitory computer readable medium.

SUMMARY

According to an aspect of the invention, there is provided an information processing apparatus including a first acquiring unit, an addition unit, a second acquiring unit, and an extraction unit. The first acquiring unit acquires a first group of elements included in a first image generated by reading a document. The addition unit generates multiple second images by adding noises that differ from each other to the first image. The second acquiring unit acquires second groups of elements included in the respective multiple second images. The extraction unit extracts an element representing characteristics of the document from the first group of elements in accordance with the degrees of similarity between elements included in the first group of elements and elements included in the multiple second groups of elements.

BRIEF DESCRIPTION OF THE DRAWINGS

An exemplary embodiment of the present invention will be described in detail based on the following figures, wherein.

DETAILED DESCRIPTION

Figure 1:
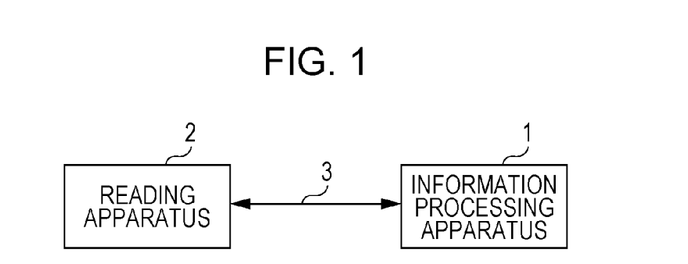
FIG. 1 is a diagram illustrating the entirety of a system according to an exemplary embodiment.

An example of an exemplary embodiment according to the present invention will be described.
<Configuration>
FIG. 1 is a diagram illustrating the entirety of a system according to the exemplary embodiment. An information processing apparatus 1 and a reading apparatus 2 are connected via a communication unit 3 such as a local-area network (LAN). The reading apparatus 2 reads a sample of a document, generates image data, and transmits this image data to the information processing apparatus 1. The information processing apparatus 1 extracts elements representing characteristics of the document from an image represented by the received image data. The extracted elements are used to determine the type of the document, which is used in actual paperwork.

Figure 2:
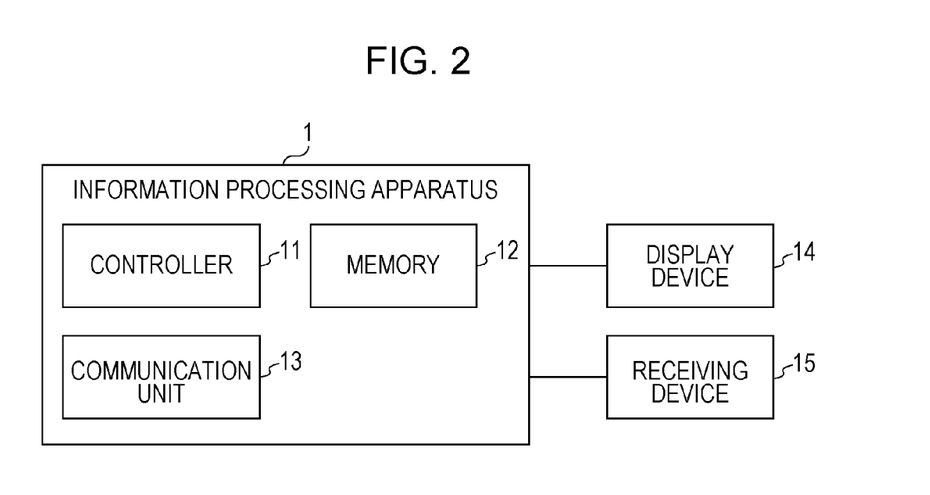
FIG. 2 is a diagram illustrating a hardware configuration of an information processing apparatus.

FIG. 2 is a diagram illustrating a hardware configuration of the information processing apparatus 1. The information processing apparatus 1 is a computer including a controller 11, a memory 12, and a communication unit 13. The controller 11 includes an arithmetic unit such as a central processing unit (CPU), and storage devices such as a read-only memory (ROM) and a random-access memory (RAM). The ROM stores firmware programs in which the procedure of starting up of a hardware device and the procedure of booting of an operating system (OS) are described. The RAM is used to store data when the CPU executes calculation. The memory 12 includes, for example, a hard disk device, and stores, for example, an OS and an application program. The communication unit 13 includes a communication interface (I/F) for communicating with the reading apparatus 2. A display device 14 and a receiving device 15 are connected to the information processing apparatus 1. The display device 14 includes, for example, a liquid crystal display device, and displays, for example, a screen for an operator to operate the information processing apparatus 1. The receiving device 15 includes, for example, a keyboard and a mouse. The receiving device 15 receives an operation performed by an operator, and outputs information corresponding to the operation to the controller 11.

The reading apparatus 2 is, for example, an image scanner including a platen glass, a baffle, a light source, an optical system, an image pickup device, and an arithmetic unit (not illustrated). The light source irradiates a document placed on the platen glass with light, and the light reflected by the document enters the image pickup device via the optical system. The image pickup device converts light that has entered the image pickup device into an image signal, and outputs the image signal to the arithmetic unit. The arithmetic unit generates raster image data in accordance with the image signal, and transmits this image data to the information processing apparatus 1. Note that a copier and the information processing apparatus 1 may be connected via the communication unit 3, and a document may be read using a reading device included in the copier. In addition, image data of a document may be transferred from the reading apparatus 2 to the information processing apparatus 1 using a recording medium such as a Universal Serial Bus (USB) memory.

Figure 3:
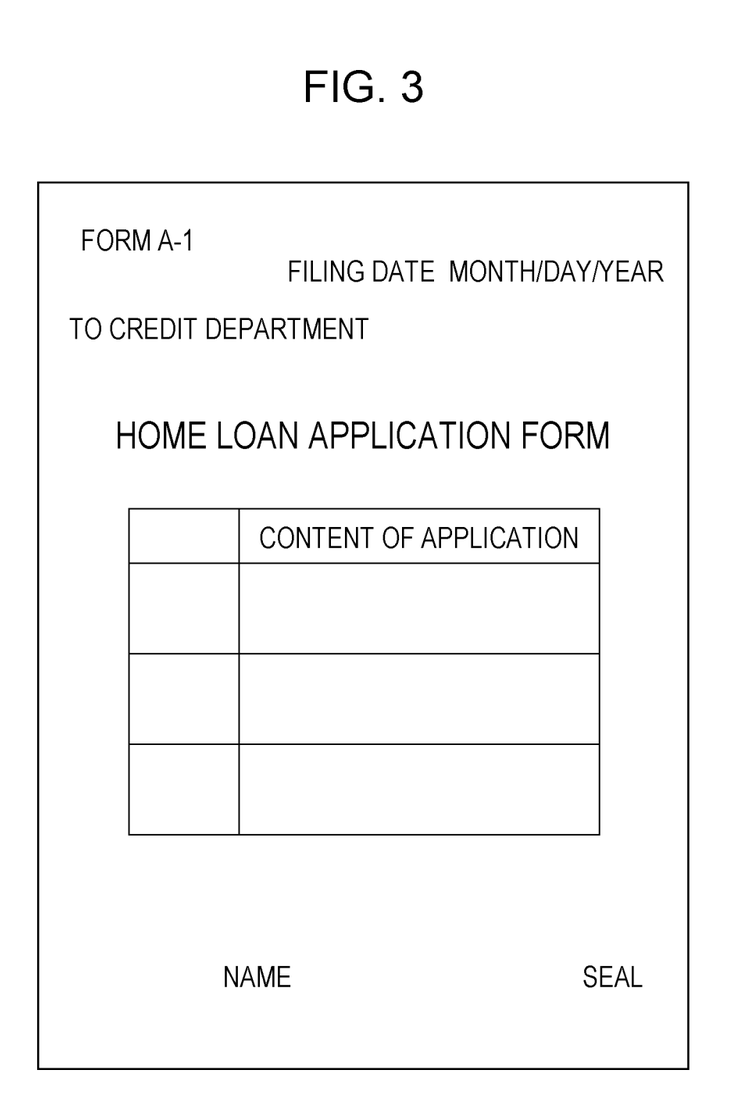
FIG. 3 is a diagram illustrating an example of a document.

FIG. 3 is a diagram illustrating an example of a document. Elements such as characters and ruled lines have already been formed on a document through for example printing. In this example, character strings of “Form A-1”, “Filing Date Month/Day/Year”, “To Credit Department”, “Home Loan Application Form”, “Content of Application”, and “Name Seal” have already been formed. In addition, ruled lines indicating fields of the content of application are formed.

Figure 4:
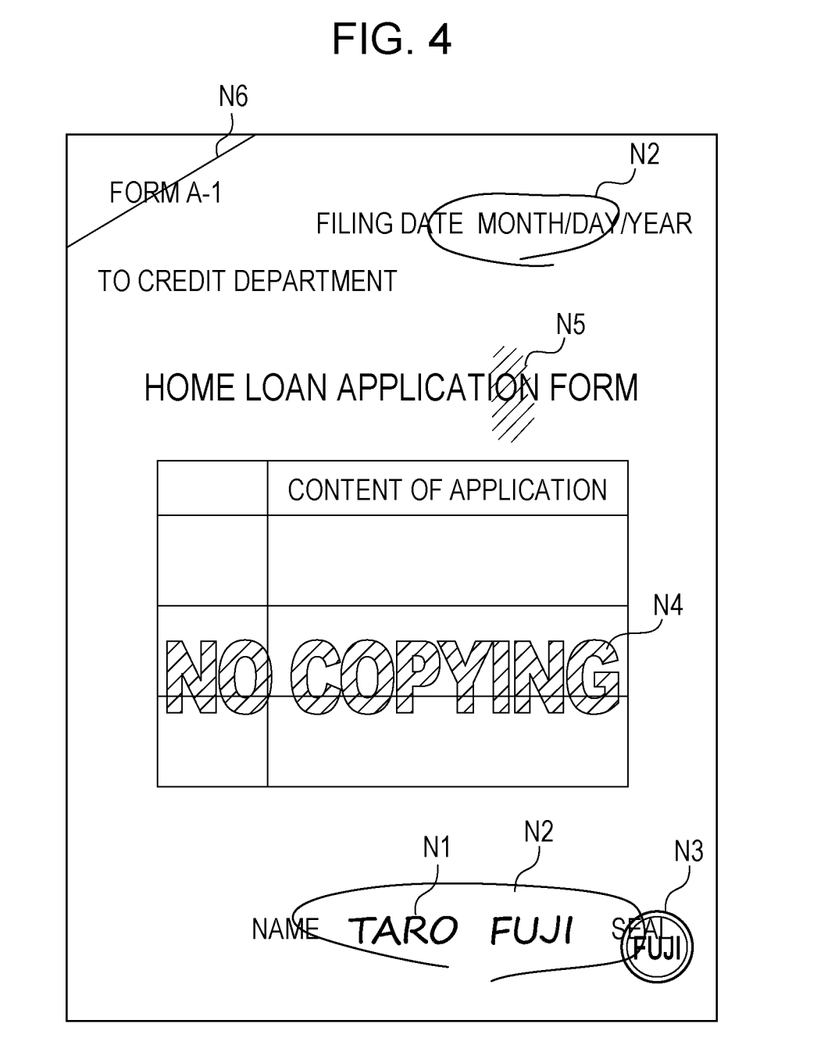
FIG. 4 is a diagram illustrating examples of noise.

FIG. 4 is a diagram illustrating examples of noise. There may be a case where noise is included in an image generated by reading a document. Noises are, for example, classified as in the following.

(a) Fill-in

Examples of a fill-in are handwritten characters and marks, an impression of a seal formed by impressing a stamp, and a mark written in pencil in order to show a section that should be filled out. In the illustrated example, a character string of "Taro Fuji" (noise N1) is handwritten in a Name field. In addition, marks (noise N2) encircling portions that should be filled out are written at a Filing Date field and the Name field. In addition, an impression of a seal (noise N3) is formed at the Name field.

(b) Watermark

There may be a case where hidden characters are set in a document so as to generate an image including a watermark when the reading apparatus 2 reads the document. A watermark is formed so as to have a certain darkness such that the watermark does not interfere with filling out and viewing of a document. To ensure viewability of a watermark itself, watermark formation is performed using for example characters in a large size, an oblique arrangement, or a regular or irregular arrangement of multiple watermarks. In the illustrated example, a watermark "No Copying" (noise N4) is formed (for the sake of drawing, hatching is used). Note that, there may also be a case where an obvious watermark is formed on a document without using hidden characters.

(c) Dirt

For example, there may be a case where dirt such as eraser debris, an ink stain, or dust clings to a document. There may also be a case where a crease or a wrinkle of a document becomes line-like dirt. There may also be a case where dirt is adhered to the platen glass of the reading apparatus 2. In the illustrated example, there are plane-like dirt (noise N5) and line-like dirt (noise N6). For the sake of drawing, hatching is used for the plane-like dirt.

(d) Show-Through

There may be a case where for example characters are formed on the reverse side of a document. For example, there may be a case where application completion instructions are described on the reverse side and a case where fields to be filled out are provided on both sides. In this manner, in the case where for example characters are described on the reverse side of a document and where a thin paper sheet is used and the characters on the reverse side show through the thin paper sheet, the characters on the reverse side may be read by the reading apparatus 2.

(e) Inclination (Skewness)

The concept of noise according to the present exemplary embodiment includes noise caused by the inclination of a document at the time of reading. For example, the inclination of a document may occur when the document is arranged at a reading position of the reading apparatus 2. In addition, in a case where a device for transporting a document to the reading position is equipped, a document may be transported with an inclined orientation. Depending on the size of this inclination, for example, characters may not be recognized, and the directions of the ruled lines may be recognized wrongly. As a result, characteristics of the document may not be accurately recognized.

Figure 5:
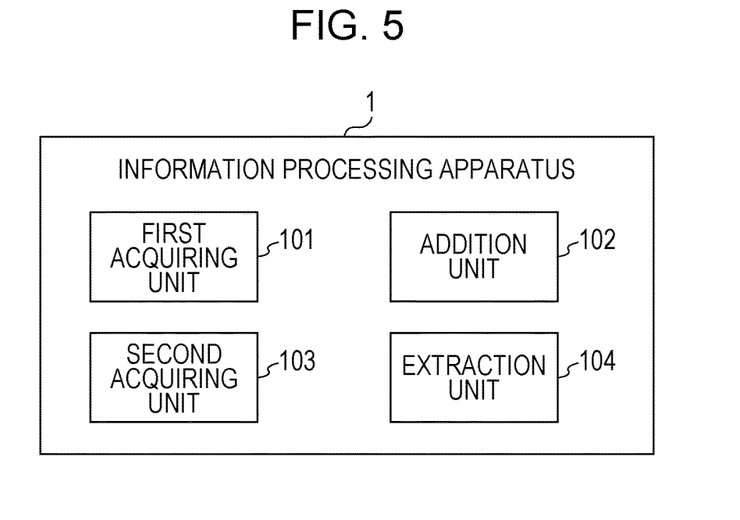
FIG. 5 is a block diagram illustrating functions of the information processing apparatus.

FIG. 5 is a block diagram illustrating functions of the information processing apparatus 1. A first acquiring unit 101 acquires a first group of elements included in a first image generated by reading a document. An addition unit 102 generates multiple second images obtained by adding noises that differ from each other to the first image. A second acquiring unit 103 acquires second groups of elements included in the respective multiple second images. An extraction unit 104 extracts elements representing characteristics of the document from the first group of elements in accordance with the degrees of similarity between elements included in the first group of elements and elements included in the multiple second groups of elements. A specific configuration for realizing these functions is as follows.

<Operation>

Figure 6:
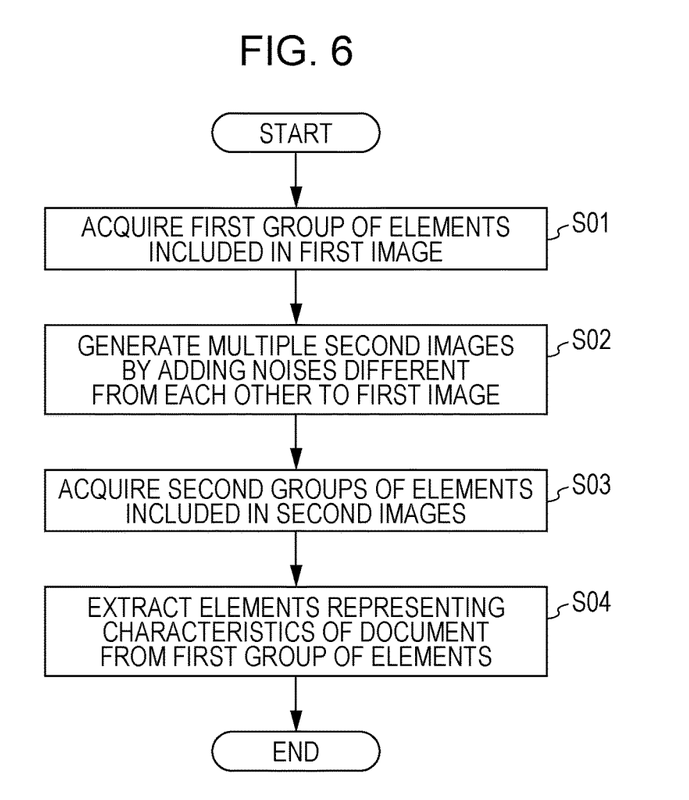
FIG. 6 is a flowchart illustrating an operation of the information processing apparatus.

FIG. 6 is a flowchart illustrating an operation of the information processing apparatus 1. An application program in which the procedure of extraction of elements representing characteristics of a document is described is installed in the information processing apparatus 1. The controller 11 of the information processing apparatus 1 executes the following process by executing this application program.

<Step S01> (Example of First Acquiring Unit 101)

First, a user causes the reading apparatus 2 to read a sample of a document. The reading apparatus 2 reads the sample of the document, generates first image data, and transmits the first image data to the information processing apparatus 1. The controller 11 of the information processing apparatus 1 executes character recognition and ruled-line recognition on a first image represented by the first image data received from the reading apparatus 2. In the character recognition, for example, an optical character recognition (OCR) method is used. In the ruled-line recognition, for example, a method for recognizing ruled lines from a cumulative sum of values of black pixels in an X-axis direction and that in a Y-axis direction is used, the method being described in paragraph 0051 of Japanese Unexamined Patent Application Publication No. 2003-109007. The present exemplary embodiment shows an example in which character strings are acquired as a first group of elements. In the example illustrated in FIG. 3, the character strings of "Form A-1", "Filing Date Month/Day/Year", "To Credit Department", "Home Loan Application Form", "Content of Application", and "Name Seal" are recognized. The controller 11 acquires these character strings as a first group of elements.

Figure 7:
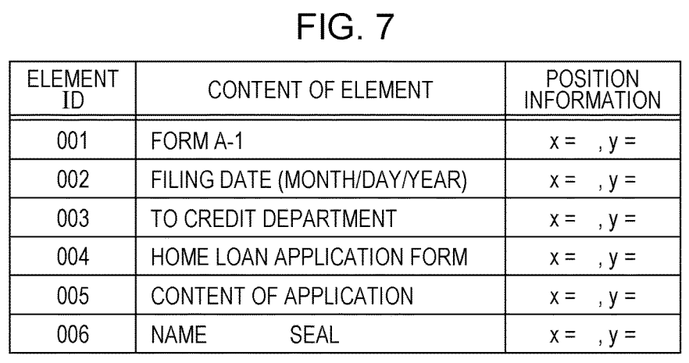
FIG. 7 is a diagram illustrating a list regarding a first group of elements.

FIG. 7 is a diagram illustrating a list regarding the first group of elements. Upon acquiring the first group of elements, the controller 11 generates a list regarding the first group of elements (hereinafter referred to as a first-group-of-element list). The first-group-of-element list is a list in which, for element IDs, each of the element IDs is associated with the content of an element and position information, and stored. An element ID is an identifier used to identify a certain element. The content of an element is, in this example, a character string recognized through character recognition. Position information is information indicating the position of a certain element in the first image, and is for example the coordinates of the upper left vertex of a rectangle circumscribing a certain character string.

<Step S02> (Example of Addition Unit 102)

The controller 11 adds noises to the first image. The noises to be added are for example the above-described (a) fill-in, (b) watermark, (c) dirt, (d) show-through, and (e) inclination. Characters assumed to show through may be a mirror image or may not be a mirror image. The memory 12 stores initial values of the noises. The initial values of the noises are, for example, the number of characters and the number of lines for (a), the area of a character string for (b), the area of an area covered with dirt for (c), the area of a show-through area for (d), and an inclination angle for (e). In addition, for example, for each element included in the first group of elements (a character string in the present exemplary embodiment), the percentage of the area of an area covered with a certain noise to a rectangle circumscribing the element may also be determined as one of initial values of the noise.

The controller 11 generates multiple second images by adding these noises to the first image. Here, the controller 11 performs control such that noises that differ from each other are to be included in the respective second images. For example, a position to which noise is added in a rectangle circumscribing a certain element may be changed from second image to second image using random numbers. In addition, for example, the area of an area covered with a certain noise in a rectangle circumscribing a certain element or the percentage of the area of an area covered with a certain noise to the area of a rectangle circumscribing an element may also be changed from second image to second image using random numbers. In short, the controller 11 generates in step S02 multiple second images by randomly changing noises, which are predetermined multiple types of noise, from second image to second image. The image illustrated in FIG. 4 is one of the multiple second images. The multiple second images differ from each other in terms of the areas, positions, and the like of the noises N1 to N6.

<Step S03> (Example of Second Acquiring Unit 103)

Similarly to as in step S01, the controller 11 executes character recognition on each of the second images, recognizes character strings, and acquires the recognized character strings as second groups of elements. Since characters to which noise is added are not recognized, character strings of "Fo A-1", "Filing Month/Day/Year", "To Credit Department", "Home Loan Applicat Form", "Content of Application", and "Na Fuji Taro" are recognized in the example illustrated in FIG. 4. The controller 11 acquires these character strings as a second group of elements. Note that, as described above, the multiple second images differ from each other in terms of the areas, positions, and the like of the noises. Thus, for example, since noise is added to "ion" of "Home Loan Application Form", "ion" is not recognized in the example illustrated in FIG. 4. If noise is added to other characters, the characters are not recognized. As a result, the second group of elements to be acquired differs from second image to second image. The controller 11 acquires the second groups of elements from the respective multiple second images. Thus, the number of the second groups of elements to be acquired is the same as the number of the second images.

Figure 8:
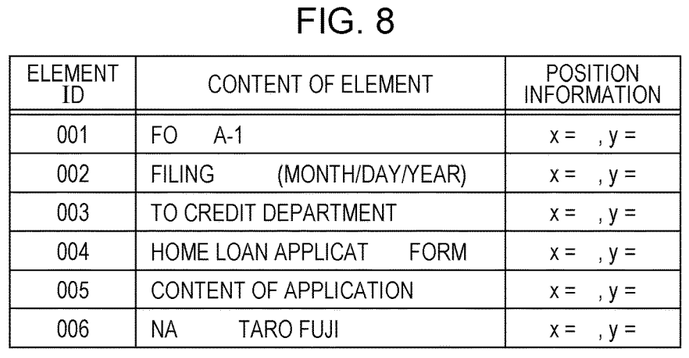
FIG. 8 is a diagram illustrating a list regarding a second group of elements.

FIG. 8 is a diagram illustrating a list regarding a second group of elements. Upon acquiring a second group of elements, the controller 11 generates a list regarding the second group of elements (hereinafter referred to as a second-group-of-element list). The second-group-of-element list is a list in which, for element IDs, each of the element IDs is associated with the content of an element and position information, and stored. The number of second-group-of-element lists to be generated is the same as the number of the second images.

<Step S04> (Example of Extraction Unit 104)

The controller 11 reads out elements corresponding to the same element ID from the first-group-of-element list and the second-group-of-element list, and calculates the degree of similarity between the two elements. In the case of a character string, the degree of similarity is the percentage of the number of matching characters to the total number of characters of the character string. For example, for an element ID=004, since the first-group-of-element list has "Home Loan Application Form" and the second-group-of-element list has "Home Loan Applicat Form", the degree of similarity is approximately 0.870.

The controller 11 performs this processing for all the second-group-of-element lists, and calculates the average of the degrees of similarity for each element ID. For example, when the contents of elements having an element ID=004 acquired from the five second images are "Home Loan Applicat Form", "Home Loan cation Form", "Home Loan Applic Form", "Home Loan Application Form", and "Home Loan Ap Form", the average of the degrees of similarity is approximately (0.870+0.783+0.783+1.0+0.609)/5=0.809. When the average of the degrees of similarity for a certain element reaches a predetermined threshold, the controller 11 determines the element to be an element representing characteristics of the document. For example, in the case where the threshold is 0.4, the average of the degrees of similarity for the element having an element ID=004 exceeds the threshold, and thus the element is determined to be an element representing characteristics of the document.

Figure 9:
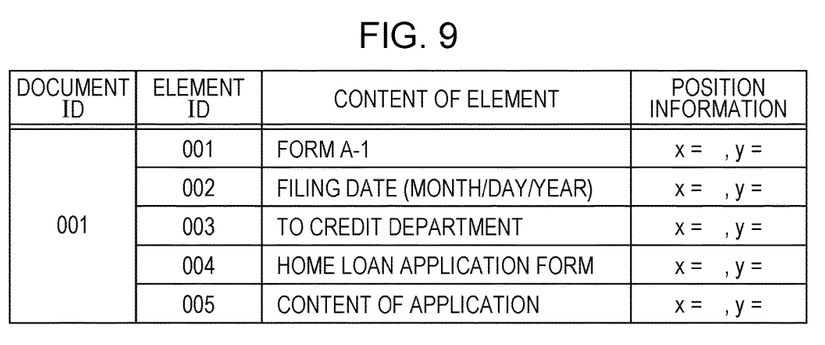
FIG. 9 is a diagram illustrating a characteristic list.

FIG. 9 is a diagram illustrating a characteristic list. When the above-described processing is completed for all the element IDs, the controller 11 generates a characteristic list. The characteristic list is a list in which the element ID of an element representing characteristics of the document, the content of the element, and position information are associated with each other and stored. In this example, the average of the degrees of similarity for "Name Seal" having an element ID=006 does not reach the threshold, and thus the elements having element IDs=001 to 005 are extracted as elements representing characteristics of the document. The controller 11 generates characteristic lists for respective documents. The controller 11 generates a document ID, which is an identifier used to identify a generated characteristic list among the characteristic lists, and associates the document ID with the characteristic list. In this example, the generated characteristic list is associated with a characteristic ID=001. As described above, the elements representing characteristics of the document are extracted from the first group of elements. Note that the display device 14 may be caused to display an image representing an extraction result of elements representing characteristics of the document. For example, the display device 14 may be caused to display the generated characteristic list. The display device 14 may also be caused to display an image representing a document in which the elements extracted as elements representing characteristics of the document are visually emphasized.

Implementation Example

Next, an implementation example of a document process using characteristic lists generated as above will be described. The memory 12 stores multiple characteristic lists generated in accordance with the above-described procedure. These characteristic lists are associated with respective document IDs, which differ from each other. At first, a user causes the reading apparatus 2 to read a document. This document is, for example, the document illustrated in FIG. 3 (Home Loan Application Form) filled out by an applicant for a home loan. The reading apparatus 2 reads this document, generates third image data, and transmits the third image data to the information processing apparatus 1. The controller 11 of the information processing apparatus 1 executes character recognition on a third image represented by the third image data received from the reading apparatus 2, acquires recognized character strings as a third group of elements, and generates a list regarding the third group of elements (hereinafter referred to as a third-group-of-element list). The configuration of the third-group-of-element list is substantially the same as that of the above-described first-group-of-element list.

The controller 11 reads out, from a certain characteristic list, elements corresponding to pieces of position information about the elements included in the third-group-of-element list, and calculates the degrees of similarity between the elements included in the third-group-of-element list and the elements read out from the characteristic list. For each of the elements included in the third-group-of-element list, when the characteristic list does not include an element corresponding to the position information about the element included in the third-group-of-element list, the degree of similarity for the element is 0.0. The controller 11 calculates, for each characteristic list, a point in accordance with the degrees of similarity for the elements included in the characteristic list, and extracts a characteristic list whose point is greater than or equal to a threshold and is the highest.

The memory 12 is provided with a directory for storing the third image data. In the layer immediately below this directory, multiple directories associated with respective document IDs and one directory that is not associated with any document ID (a directory for unknown documents) are provided. The controller 11 stores the third image data in a directory associated with the same document ID as the document ID of the extracted characteristic list. In the case where the points of all the characteristic lists do not reach the threshold, the controller 11 stores the third image data in the directory for unknown documents. The type of the document is determined in this manner.

<Modification>

The exemplary embodiment may be modified as follows. In addition, multiple modifications may be combined.

<First Modification>

The above-described exemplary embodiment has shown that, as an example, the controller 11 of the information processing apparatus 1 extracts the first group of elements and the second groups of elements using, for example, character recognition and ruled-line recognition. However, for example, a user specifies certain elements using a mouse on a screen where an image of a document is displayed, and the controller 11 may acquire the specified elements as a first group of elements and second groups of elements.

<Second Modification>

Conditions may be set for the noises to be added to the first image. Specifically, the display device 14 is caused to display a menu indicating types of noise, and the type of noise specified by a user on the menu may be added to a region specified by the user on a screen displaying the first image.

<Third Modification>

In the above-described example, it is determined in step S04 of the above-described exemplary embodiment that when the average of the degrees of similarity for a certain element reaches a predetermined threshold, the element is an element representing characteristics of the document. However, a certain element having the highest average of the degrees of similarity may be determined to be the element representing characteristics of the document. In addition, when the average of the degrees of similarity for a certain element reaches a predetermined threshold and the certain element has the highest average of the degrees of similarity, the certain element may be determined to be the element representing characteristics of the document.

<Fourth Modification>

There may be a case where when a document generated by copying is further copied, and further copying of the resulting document is repeatedly performed, the clarity of characters and lines is reduced and feature portions are incorrectly recognized. The reduction in clarity caused by such further copying performed repeatedly is considered to be a type of noise. In this case, noise may be added to the first image by performing, for example, a process for blurring away edges of characters, and a process for changing the width of lines.

<Fifth Modification>

The above-described exemplary embodiment has shown that, as an example, the positions or areas of noises are changed from second image to second image using random numbers. However, for example, the positions or areas of noises may be changed from second image to second image regularly. In short, any configuration is available as long as multiple second images are generated by adding noises that differ from each other to the first image.

<Sixth Modification>

The above-described exemplary embodiment has shown that, as an example, the above-described functions are realized by the information processing apparatus 1 executing an application program. However, part or all of the above-described functions may also be implemented using hardware circuits. In addition, the application program may be recorded on a computer readable recording medium such as an optical recording medium or a semiconductor memory, and provided. The application program may be read from this computer readable recording medium and installed. In addition, this application program may also be provided through electric telecommunication lines.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a first acquiring unit that acquires a first group of elements included in a first image generated by reading a document;
    an addition unit that generates a plurality of second images by adding noises that differ from each other to the first image;
    a second acquiring unit that acquires second groups of elements included in the respective plurality of second images;
    a comparing unit that compares the first group of elements from the first image with the second group of elements from each of the plurality of second images to obtain a degree of similarity; and
    an extraction unit that extracts an element representing characteristics of the document from the first group of elements in accordance with the degrees of similarity between elements included in the first group of elements and elements included in the plurality of second groups of elements.

2. The information processing apparatus according to claim 1,
    wherein the addition unit generates each of the plurality of second images by adding, to the first image, a certain noise that is a predetermined type of noise among the noises so that certain noises included in the plurality of respective second images differ from each other.

3. The information processing apparatus according to claim 1,
    wherein the addition unit generates each of the plurality of second images by adding, to the first image, certain noises that are predetermined types of noise among the noises so that certain noises included in the plurality of respective second images differ from each other.

4. The information processing apparatus according to claim 1, wherein the extraction unit extracts, as an element representing characteristics of the document, an element whose degree of similarity reaches a threshold.

5. The information processing apparatus according to claim 2, wherein the extraction unit extracts, as an element representing characteristics of the document, an element whose degree of similarity reaches a threshold.

6. The information processing apparatus according to claim 3, wherein the extraction unit extracts, as an element representing characteristics of the document, an element whose degree of similarity reaches a threshold.

7. The information processing apparatus according to claim 1, wherein the extraction unit extracts, as an element representing characteristics of the document, an element whose degree of similarity is the highest.

8. The information processing apparatus according to claim 2, wherein the extraction unit extracts, as an element representing characteristics of the document, an element whose degree of similarity is the highest.

9. The information processing apparatus according to claim 3, wherein the extraction unit extracts, as an element representing characteristics of the document, an element whose degree of similarity is the highest.

10. The information processing apparatus according to claim 4, wherein the extraction unit extracts, as an element representing characteristics of the document, an element whose degree of similarity is the highest.

11. The information processing apparatus according to claim 5, wherein the extraction unit extracts, as an element representing characteristics of the document, an element whose degree of similarity is the highest.

12. The information processing apparatus according to claim 6, wherein the extraction unit extracts, as an element representing characteristics of the document, an element whose degree of similarity is the highest.

13. An information processing method comprising:
acquiring a first group of elements included in a first image generated by reading a document;
generating a plurality of second images by adding noises that differ from each other to the first image;
acquiring second groups of elements included in the respective plurality of second images;
comparing the first group of elements from the first image with the second group of elements from each of the plurality of second images to obtain a degree of similarity; and
extracting an element representing characteristics of the document from the first group of elements in accordance with the degrees of similarity between elements included in the first group of elements and elements included in the plurality of second groups of elements.

14. A non-transitory computer readable medium storing a program causing a computer to execute a process, the process comprising:
acquiring a first group of elements included in a first image generated by reading a document;
generating a plurality of second images by adding noises that differ from each other to the first image;
acquiring second groups of elements included in the respective plurality of second images;
comparing the first group of elements from the first image with the second group of elements from each of the plurality of second images to obtain a degree of similarity; and
extracting an element representing characteristics of the document from the first group of elements in accordance with the degrees of similarity between elements included in the first group of elements and elements included in the plurality of second groups of elements.

* * * * *